J. MORRIS.
CAR STEP ATTACHMENT.
APPLICATION FILED APR. 26, 1912.
1,052,364.
Patented Feb. 4, 1913.
2 SHEETS—SHEET 2.
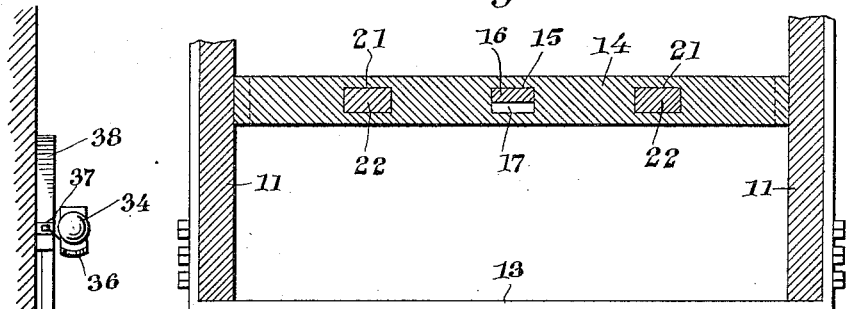
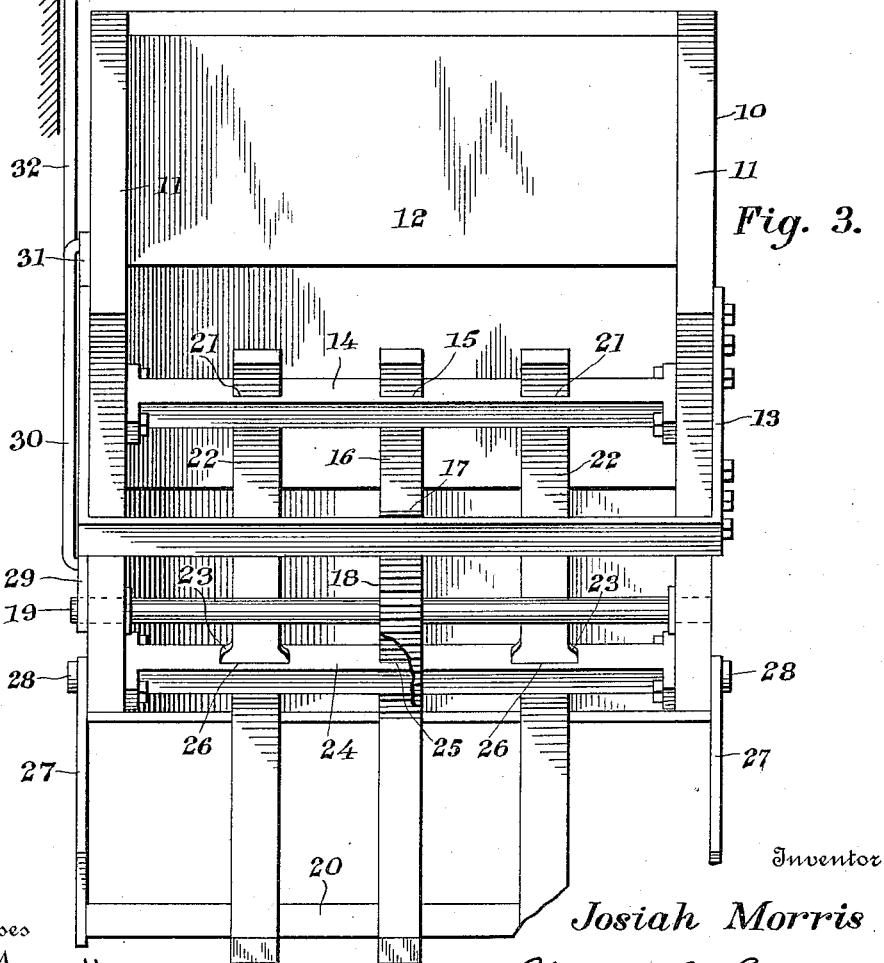
Inventor
Josiah Morris
By Victor J. Evans
Attorney

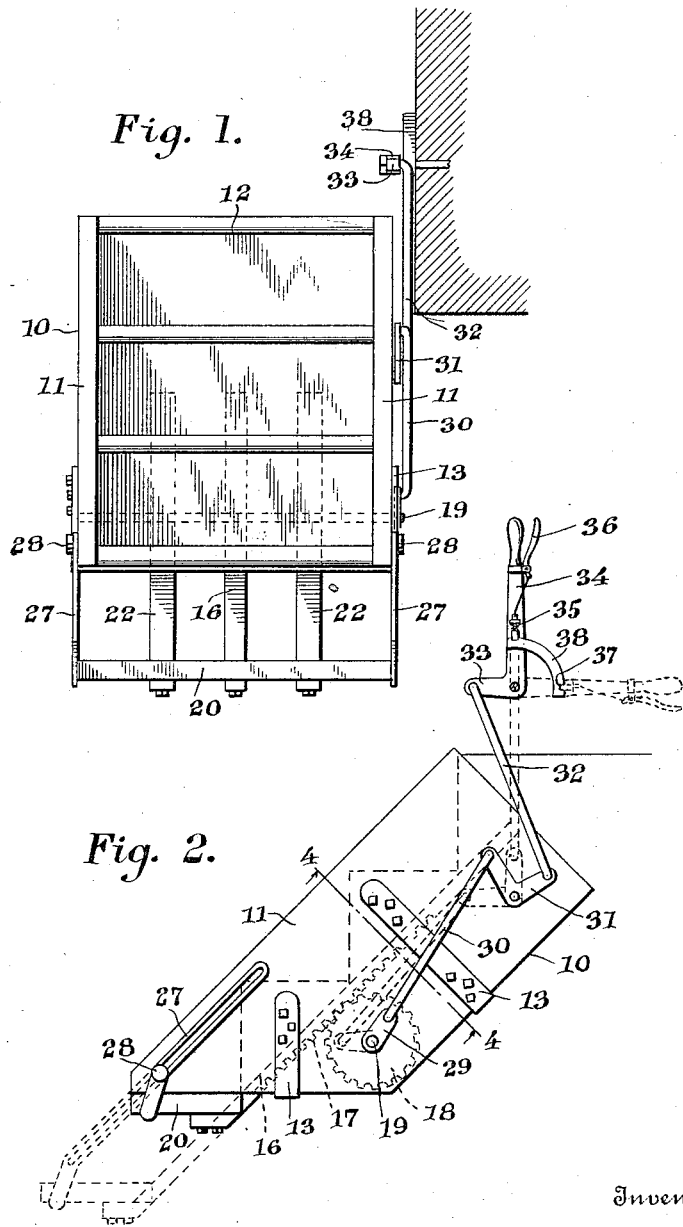

UNITED STATES PATENT OFFICE.

JOSIAH MORRIS, OF ATLANTA, GEORGIA, ASSIGNOR OF ONE-HALF TO HERBERT W. RIDGELY, OF ATLANTA, GEORGIA.

CAR-STEP ATTACHMENT.

1,052,364.  Specification of Letters Patent.  Patented Feb. 4, 1913.

Application filed April 26, 1912. Serial No. 693,412.

*To all whom it may concern:*

Be it known that I, JOSIAH MORRIS, a citizen of the United States, residing at Atlanta, in the county of Fulton and State of Georgia, have invented new and useful Improvements in Car-Step Attachments, of which the following is a specification.

An object of the invention is to provide an attachment for car steps involving an extensible step arranged between the ground and the car step and movable to reduce the stepping space from the ground to the step or vice versa.

The invention embodies, among other features, a device that can be conveniently attached to a car step and manually operated to move a step member in extended position below the lowermost step of the car step, the extensible step member being movable to closed position beneath the car step so that the extensible member will not strike the ground or objects adjacent the car tracks when the cars are placed in operation.

In the further disclosure of the invention reference is to be had to the accompanying drawings constituting a part of this specification in which similar characters of reference denote corresponding parts in all the views, and in which:

Figure 1 is a front elevation of a car step showing my device attached thereto and in extended position; Fig. 2 is a side elevation, showing the extensible member in closed position; Fig. 3 is a bottom plan view, the extensible member being in extended position; and Fig. 4 is a transverse sectional view taken on the line 4—4 in Fig. 2.

Referring more particularly to the views, use is made of a frame 10 comprising sides 11 secured to the sides of a step frame 12 by braces 13, suitable bolts being passed through the braces, the sides 11 and the step frame 12, the said braces being extended beneath the step frame to relatively secure the said sides.

A guide bar 14 has the ends thereof secured to the sides 11, the said guide bar being arranged to extend transversely beneath the step frame 12 and provided with an aperture 15, through which is slidably extended a rack bar 16 provided with teeth 17 on the under side thereof, the said teeth being adapted to mesh with a toothed wheel 18 keyed to a shaft 19 journaled in the sides 11, the mentioned rack bar 16 being arranged in a central position relatively to the frame 10 and having the lower end thereof bent forwardly for rigid connection with an extensible step member 20.

Mounted to slidably extend through apertures 21 in the guide bar 14 are supporting bars 22 having the extensible member 20 rigidly secured to the lower ends thereof, the said supporting bars being provided with integral stop lugs 23 adapted to engage a second guide bar 24 secured to the lower end of the frame 10, thus limiting the downward or extensible movement of the step member 20, the rack bar 16 being arranged to pass through an aperture 25 in the second guide bar 24, and the supporting bars 22 being arranged to slidably extend through apertures 26 provided in the second guide bar 24, it being understood that the extensible member 20, when arranged in extended position, will be supported a distance from the lower end of the step frame 12, equal to the distance between the individual steps of the step frame 12. A slotted guide rod 27 is pivotally mounted on one end of the step member 20 and a pin 28 is secured to one of the sides 11, the said pin being extended through the slot of the rod 27 to aid in properly guiding the step member 20 when the same is moved to or from extended position.

A plate 29 is keyed to the shaft 19 and pivotally connected thereto is a rod 30 having the upper end thereof pivotally connected to a bell crank lever 31 mounted to turn on one of the sides 11, a rod 32 being pivotally connected to the other arm of the bell crank lever 31 and connected to a laterally extending arm 33 of a lever 34, preferably connected to the car or vehicle upon which the step frame 12 is mounted, the mentioned lever 34 being movable from vertical to horizontal position as shown in the views. A spring actuated locking member 35 is mounted to slide on the lever 34 and is operated by a suitable handle 36 arranged adjacent the upper end of the lever 34, the mentioned locking member being received in notches 37 provided in a segmentally shaped plate 38 secured to a wall of the car or vehicle.

Assuming that the step member 20 is in closed position so that the step member will abut against the lowermost step of the step frame 12, when it is desired to move the step member into extended position, the upper end of the actuating lever 34 is grasped and the handle 36 pressed against the lever 34 to remove the locking member 35 from engagement with the plate 38, after which the lever 34 is swung downwardly into horizontal position, thus operating the bell crank lever 31, through the medium of the rod 32, and imparting rotation to the shaft 19 through the medium of the rod 30 and the plate 29 keyed to the shaft 19, the rotation of the shaft 19 being adapted to rotate the toothed wheel 18, the teeth of which, meshing with the teeth of the rack bar 16, will cause the rack bar to slide in the guide bars 14 and 24, thus moving the step member 20 downwardly and into extended position as shown, the stop lugs 23, formed on the supporting bars 22, being adapted to limit the extensible movement of the member 20 and the mentioned supporting bars 22 being adapted to support the step member 20 in extended position so that the step member will appear as one of the steps of the step frame 12, the pressure on the handle 36 being then released to permit the locking member 35 to engage the plate 38 and retain the actuating lever in rigid horizontal position. By simply disengaging the locking member 35 from the plate 38 and swinging the actuating lever 34 upwardly to vertical position the rotation of the toothed wheel 18 will be reversed, thus causing the rack bar 16 to move upwardly and carry the step member 20 into closed position as shown in Fig. 2.

Having thus described my invention, I claim:

1. In a device of the class described, the combination with a frame, of a plurality of guide bars secured thereto, a rack bar mounted to slide on the guide bars, supporting bars mounted to slide on the guide bars, a step member rigidly secured to the said rack bar and the said supporting bars and movable therewith, a shaft journaled on the said frame, a toothed wheel keyed to the said shaft and in mesh with the said rack bar for operating the same, means for imparting rotation to the said shaft to rotate the said toothed wheel and operate the said bar to move the said step member into extended position, and stop lugs formed on the said supporting bars and adapted to engage one of the said guide bars to limit the extensible movement of the said step member.

2. In a device of the class described, the combination with a frame, of a plurality of guide bars secured thereto, a rack bar mounted to slide on the guide bars, supporting bars mounted to slide on the guide bars, a step member rigidly secured to the said rack bar and the said supporting bars and movable therewith, a shaft journaled on the said frame, a toothed wheel keyed to the said shaft and in mesh with the said rack bar for operating the same, means for imparting rotation to the said shaft to rotate the said toothed wheel and operate the said bar to move the said step member into extended position, a slotted guide rod mounted on the said step member, and a pin secured to the said frame and extended through the slot of the said rod to guide the said step member.

3. In a device of the class described, the combination with a frame, of a plurality of guide bars secured thereto, a rack bar mounted to slide on the guide bars, supporting bars mounted to slide on the guide bars, a step member rigidly secured to the said rack bar and the said supporting bars and movable therewith, a shaft journaled on the said frame, a toothed wheel keyed to the said shaft and in mesh with the said rack bar for operating the same, means for imparting rotation to the said shaft to rotate the said toothed wheel and operate the said bar to move the said step member into extended position, and a slotted guide rod mounted on the said step member and slidably connected to the said frame for guiding the said step member.

4. In a device of the class described, the combination with a frame, of a rack bar mounted to slide thereon, supporting bars mounted to slide on the frame, an extensible member secured to the said rack bar and said supporting bars, a shaft journaled on the said frame, a toothed wheel keyed to the said shaft and in mesh with the said guide bar, an operating lever, a connection between the said operating lever and the said shaft for imparting rotation to the said toothed wheel to actuate the said rack bar and move the said step member when the said lever is operated, and means on the said supporting bars for limiting the extensible movement of the said step member.

5. In a device of the class described, the combination with a frame, of a rack bar mounted to slide thereon, supporting bars mounted to slide on the frame, an extensible member secured to the said rack bar and said supporting bars, a shaft journaled on the said frame, a toothed wheel keyed to the said shaft and in mesh with the said guide bar, an operating lever, a connection between the said operating lever and the said shaft for imparting rotation to the said toothed wheel to actuate the said rack bar and move the said step member when the said lever is operated, and stop lugs integrally formed on the said supporting bars and adapted to engage the said frame to limit the extensible movement of the said step member.

In testimony whereof I affix my signature in presence of two witnesses.

JOSIAH MORRIS.

Witnesses:
 JNO. Q. HOOPER,
 H. W. RIDGELY.

Copies of this patent may be obtained for five cents each, by addressing the "Commissioner of Patents, Washington, D. C."